(12) United States Patent
Yamamoto et al.

(10) Patent No.: US 11,676,630 B1
(45) Date of Patent: Jun. 13, 2023

(54) SERVO WRITER HEAD DESIGN FOR THE ROTATED SERVO PATTERN

(71) Applicant: Western Digital Technologies, Inc., San Jose, CA (US)

(72) Inventors: Satoshi Yamamoto, San Jose, CA (US); Masahito Kobayashi, Fujisawa (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/651,117

(22) Filed: Feb. 15, 2022

(51) Int. Cl.
*G11B 5/584* (2006.01)
*G11B 5/48* (2006.01)

(52) U.S. Cl.
CPC ............ *G11B 5/584* (2013.01); *G11B 5/4893* (2013.01)

(58) Field of Classification Search
None
See application file for complete search history.

(56) References Cited

U.S. PATENT DOCUMENTS

| | | | |
|---|---|---|---|
| 6,018,434 A | 1/2000 | Saliba | |
| 6,222,698 B1 | 4/2001 | Barndt et al. | |
| 6,522,490 B1 | 2/2003 | Cates et al. | |
| 7,289,289 B2 * | 10/2007 | Hoerger | G11B 5/584 |
| 7,529,061 B2 | 5/2009 | Bui et al. | |
| 7,672,076 B2 | 3/2010 | Nakao et al. | |
| 7,986,485 B2 | 7/2011 | Mckinstry et al. | |
| 8,094,402 B2 | 1/2012 | Bui et al. | |
| 10,650,852 B2 | 5/2020 | Judd et al. | |
| 10,770,102 B2 | 9/2020 | Bui et al. | |
| 2003/0234998 A1 * | 12/2003 | Magnusson | G11B 15/6655 360/48 |
| 2004/0218304 A1 * | 11/2004 | Goker | G11B 5/584 |
| 2007/0097537 A1 * | 5/2007 | Hoerger | G11B 5/584 |
| 2008/0049356 A1 * | 2/2008 | Weber | G11B 5/584 |
| 2013/0265672 A1 * | 10/2013 | Johnson | G11B 5/584 360/111 |
| 2014/0002923 A1 * | 1/2014 | Cherubini | G11B 5/00817 360/134 |
| 2015/0043101 A1 * | 2/2015 | Biskeborn | G11B 5/4893 360/71 |
| 2015/0318008 A1 * | 11/2015 | Cherubini | G11B 20/1201 360/48 |

(Continued)

FOREIGN PATENT DOCUMENTS

JP  2009151851 A  7/2009

OTHER PUBLICATIONS

Cherubini et al. "Control Methods in Data-Storage Systems," IEEE Transactions on Control Systems Technology, vol. 20, No. 2, pp. 296-322, Mar. 2012, doi: 10.1109/TCST.2011.2176942.

(Continued)

*Primary Examiner* — Peter Vincent Agustin
(74) *Attorney, Agent, or Firm* — Patterson + Sheridan, LLP; Steven H. VerSteeg

(57) ABSTRACT

The present disclosure is generally related to a servo track writer (STW) head for writing a rotated servo pattern. The STW head comprises a first writer stripe having a first length tilted at a first angle and a second writer stripe having a second length tilted at a second angle. The STW head may be tilted at a non-perpendicular angle relative to the edge of a tape configured to pass under the STW head.

20 Claims, 10 Drawing Sheets

(56) References Cited

U.S. PATENT DOCUMENTS

2022/0108718 A1* 4/2022 Bui .................. G11B 5/584

OTHER PUBLICATIONS

Cherubini et al. "Fast servo signal acquisition in tape drives using servo and data channels," Mechatronics, vol. 22, No. 3, 2012, pp. 349-360, ISSN 0957-4158, https://doi.org/10.1016/j.mechatronics.2011.12.002.
Lantz "Advanced tape technologies," IBM, Nov. 2, 2016, Retrieved May 10, 2021, 5 pages, <https://www.zurich.ibm.com/sto/tape/servo/servoformat.html>.
Lantz et al. "Servo-Pattern Design and Track-Following Control for Nanometer Head Positioning on Flexible Tape Media," IEEE Transactions on Control Systems Technology, vol. 20, No. 2, pp. 369-381, Mar. 2, 2012, doi: 10.1109/TCST.2011.2177979.

* cited by examiner

SERVO WRITER HEAD DESIGN FOR THE ROTATED SERVO PATTERN

BACKGROUND OF THE DISCLOSURE

Field of the Disclosure

Embodiments of the present disclosure generally relate to a servo track writer (STW) head for writing a rotated servo pattern.

Description of the Related Art

Conventional tape drive storage systems comprise a magnetic tape wound around a dual reel (reel-to-reel cartridge) or a single reel (endless tape cartridge), wherein the reel(s) are rotated in order to move the magnetic tape over one or more transducer heads during write/read operations. When data is initially written to the tape, the written track is well aligned with the magnetic recording head. However, when the tape is stored, the tape may shrink or expand due to tension, temperature, and humidity. Thus, when the tape is read the data written on the track is now shifted in relation to the original location. If there is too great a difference between the spacing of the written track on the tape and the reader on the recording head, the data cannot be read back. This phenomenon is known as media dimensional instability or tape dimensional stability (TDS).

In order to allow the read/write operations on distorted tape servo signals written onto the tape in advance, and the servo signals are read by the read/write head, while the position of the magnetic head relative to the magnetic tape is servo controlled. Each servo signal is formed by repeating, at predetermined intervals in the length of the magnetic tape, a servo pattern including a B burst and an A burst. Previous approaches account for TDS by tilting the reader/writer bar a small amount relative to an original perpendicular angle, such as about 5 degrees to about 10 degrees. The larger the initial tilt angle, the greater the TDS control coverage. However, when the servo reader angle is tilted from its original perpendicular angle, the magnitude of read-back signals in the servo A burst and B burst becomes un-balanced.

Therefore, there is a need in the art for an improved tilted servo head that increases read-back signal accuracy.

SUMMARY OF THE DISCLOSURE

The present disclosure is generally related to a servo track writer (STW) head for writing a rotated servo pattern. The STW head comprises a first writer stripe having a first length tilted at a first angle and a second writer stripe having a second length tilted at a second angle. The STW head may be tilted at a non-perpendicular angle relative to the edge of a tape configured to pass under the STW head.

In one embodiment, a servo track writer (STW) head comprising: a first writer stripe tilted at a first angle, wherein the first writer stripe has a first stripe length; and a second writer stripe tilted at a second angle, wherein the second writer stripe has a second stripe length different than the first stripe length.

In another embodiment, a servo pattern writer comprising: a servo track writer (STW) head comprising: a first writer stripe having a first stripe length; and a second writer stripe having a second stripe length different than the first stripe length, wherein the STW head is tilted at a first angle relative to an edge of a hypothetical tape configured to pass under the STW head, wherein the first angle is non-perpendicular to the edge.

In yet another embodiment, a servo pattern writer comprising: a servo track writer (STW) head comprising: a first writer stripe having a first stripe length; and a second writer stripe having a second stripe length, wherein the second stripe length is substantially equal to the first stripe length, wherein the STW head is tilted at a first angle relative to an edge of a hypothetical tape configured to pass under the STW head, wherein the first angle is non-perpendicular to the edge.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of the disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure is generally related to a servo track writer (STW) head for writing a rotated servo pattern. The STW head comprises a first writer stripe having a first length tilted at a first angle and a second writer stripe having a second length tilted at a second angle. The STW head may be tilted at a non-perpendicular angle relative to the edge of a tape configured to pass under the STW head.

Figure 1:
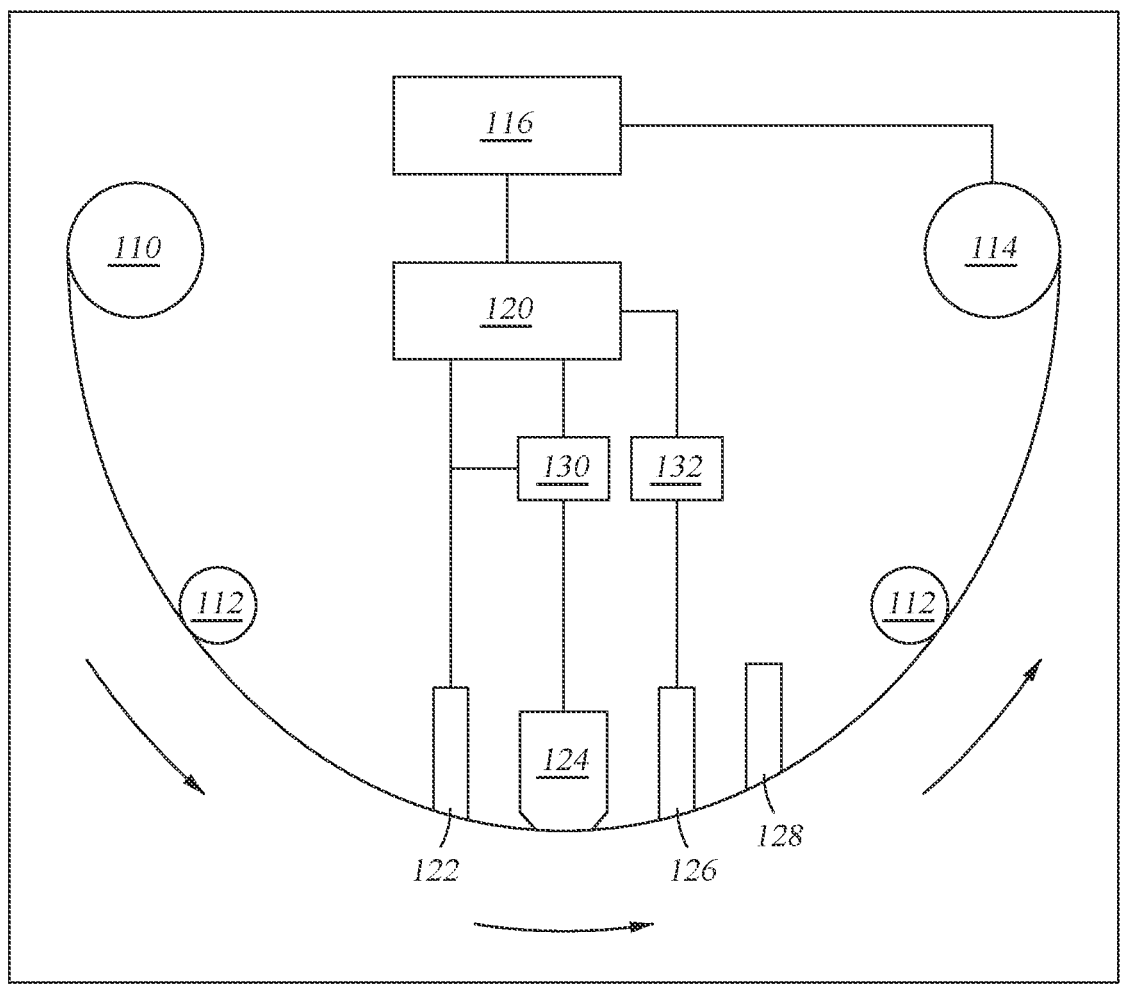
FIGS. 1 and 2 illustrate various views of a servo pattern writer according to one embodiment.
Figure 2:
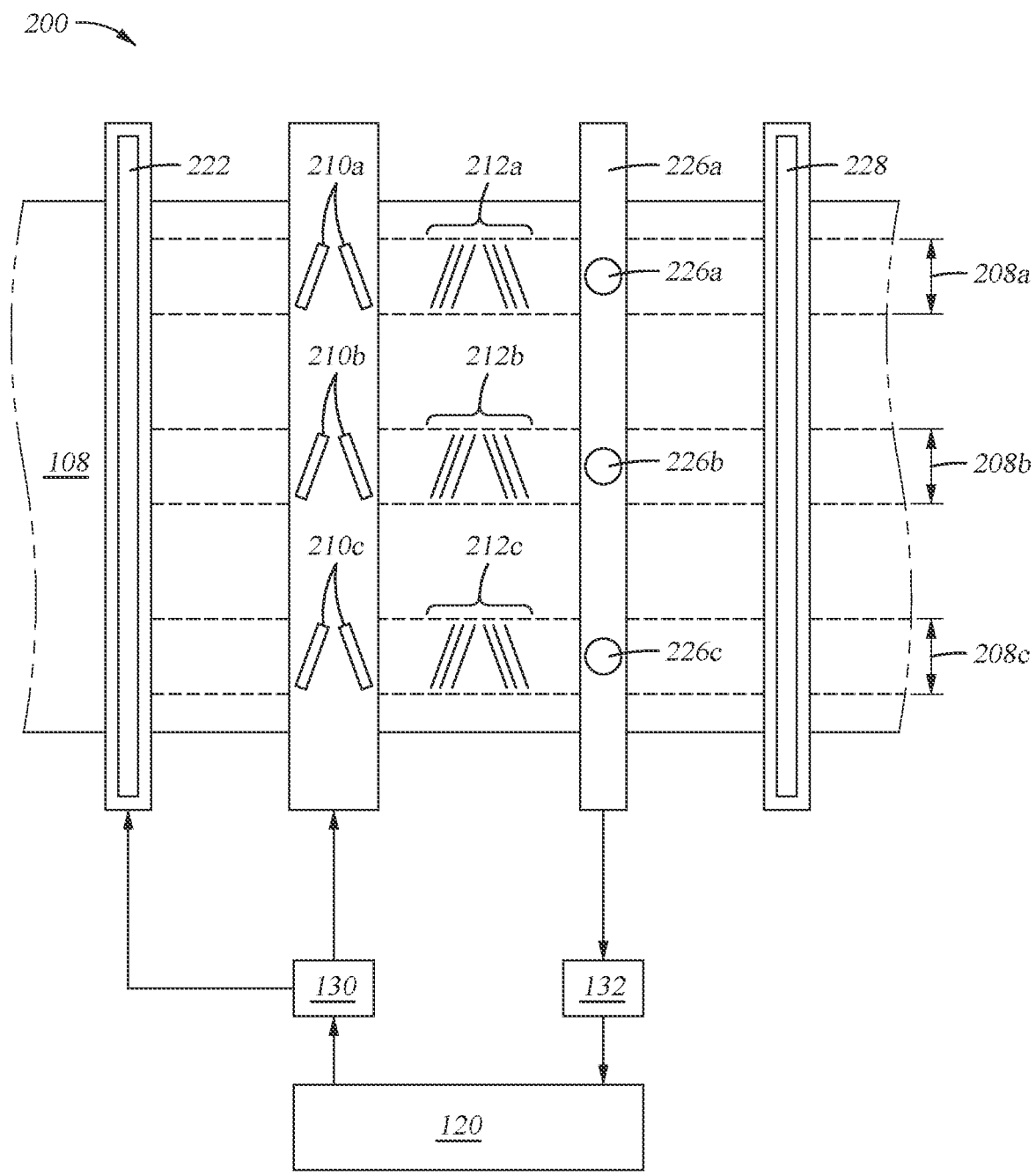

FIGS. 1 and 2 illustrate various views of a servo pattern writer according to one embodiment. FIG. 1 illustrates a front facing view of a servo pattern writer 100 according to one embodiment. Servo pattern writer 100 is a dual reel cartridge comprising a tape 108 that is fed from a supply reel 110, guided by guides 112 around one or more transducer heads, and taken up by a take-up reel 114. A take-up reel driving device 116 rotatably drives the take-up reel 114 to wind the tape 108 around the take-up reel 114.

A control device 120 controls a DC erase head 122, a servo track write (STW) head bar 124, a servo signal read head 126, an AC erase head 128, and a pulse generation circuit 130. The control device 120 may be coupled to a memory (not shown). The control device 120 generates a motor current signal that is sent to the take-up reel driving device 116 which sets the traveling speed of the tape 108. The control device 120 further generates a pulse control signal and transmits it to the pulse generation circuit 130.

The pulse generation circuit 130 supplies a current to the DC erase head 122 which magnetizes the tape 108 in the traveling direction of the tape (indicated by the arrows). As the tape 108 passes across the STW head bar 124, a servo pattern (not shown) is written to the tape 108 by magnetizing part of the tape 108 in the reverse direction. The servo pattern is then read by the servo read head 126. A preamplifier 132 amplifies the output of the servo read head 126 and transmits the amplified output to the control device 120. The AC erase head 128 erases the servo pattern by magnetizing the entire tape 108 in the reverse direction (i.e. the same direction that the servo pattern was written in).

FIG. 2 illustrates a plane view of servo pattern writer 100 according to one embodiment. The DC erase head 122 comprises an erase gap 222 which permits the current supplied by the pulse generation circuit 130 to magnetize the tape 108 in the "forward" direction (i.e. the direction the tape is traveling in). The STW head bar 124 comprises three pairs of writer stripes 210a-210c. Each pair of writer stripes 210a-210c comprises a first gap tilted at a first angle and a second gap tilted at a second angle. The pairs of writer stripes 210a-210c permit the current supplied by the pulse generation circuit 130 to magnetize a portion of a servo band 208a-208c of the tape 108 in the "reverse" direction (i.e. the opposite direction the tape is traveling in). As such, a servo pattern in the same shape of the writer stripe pairs 210a-210c is written to the tape 108 (i.e. the chevron pattern that is written to the tape 108). It is to be understood that while three pairs of writer stripes 210a-210c and three servo bands 208a-208c have been shown, the STW head bar 124 may comprise more or less writer stripe pairs depending on the embodiment. Furthermore, while the writer stripe pairs have been shown as pairs, it is contemplated that additional writer stripes may be present such that rather than two writer stripes, three, four, five, or more writer stripes may be present.

The servo signal read head 126 comprises three read elements 226a-226c to read the servo pattern written by the STW head bar 124. In some embodiments, the servo pattern writer 100 comprises an AC erase head 128. The AC erase head 128 comprises an erase gap 228. The erase gap 228 permits the current supplied by the pulse generation circuit 130 to magnetize the tape 108 in the "reverse" direction (i.e. the opposite direction the tape is traveling in).

Figure 3A:
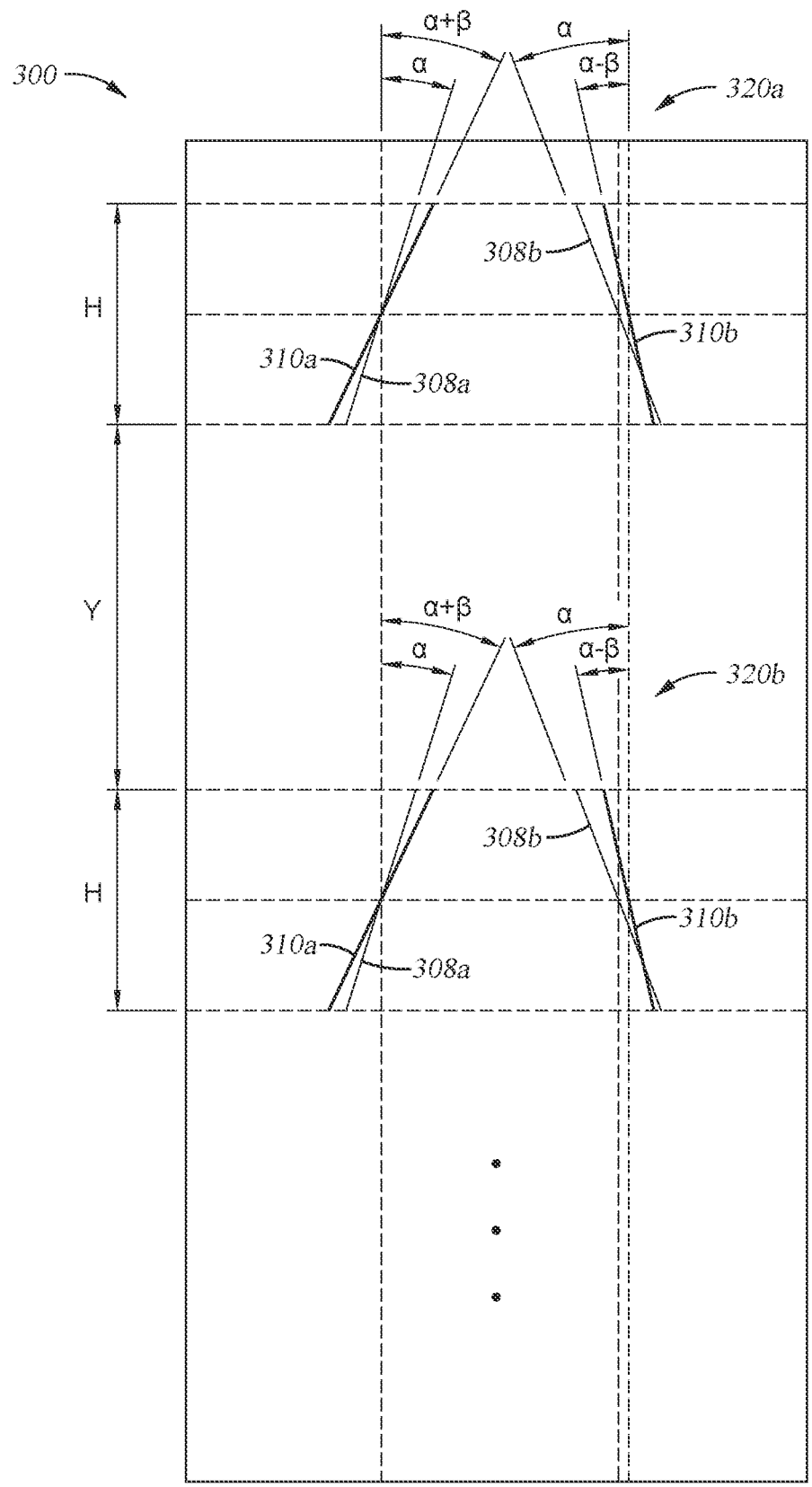
FIGS. 3A-3B illustrate a servo track writer (STW) head with rotated writer stripes according to one embodiment.
Figure 3B:
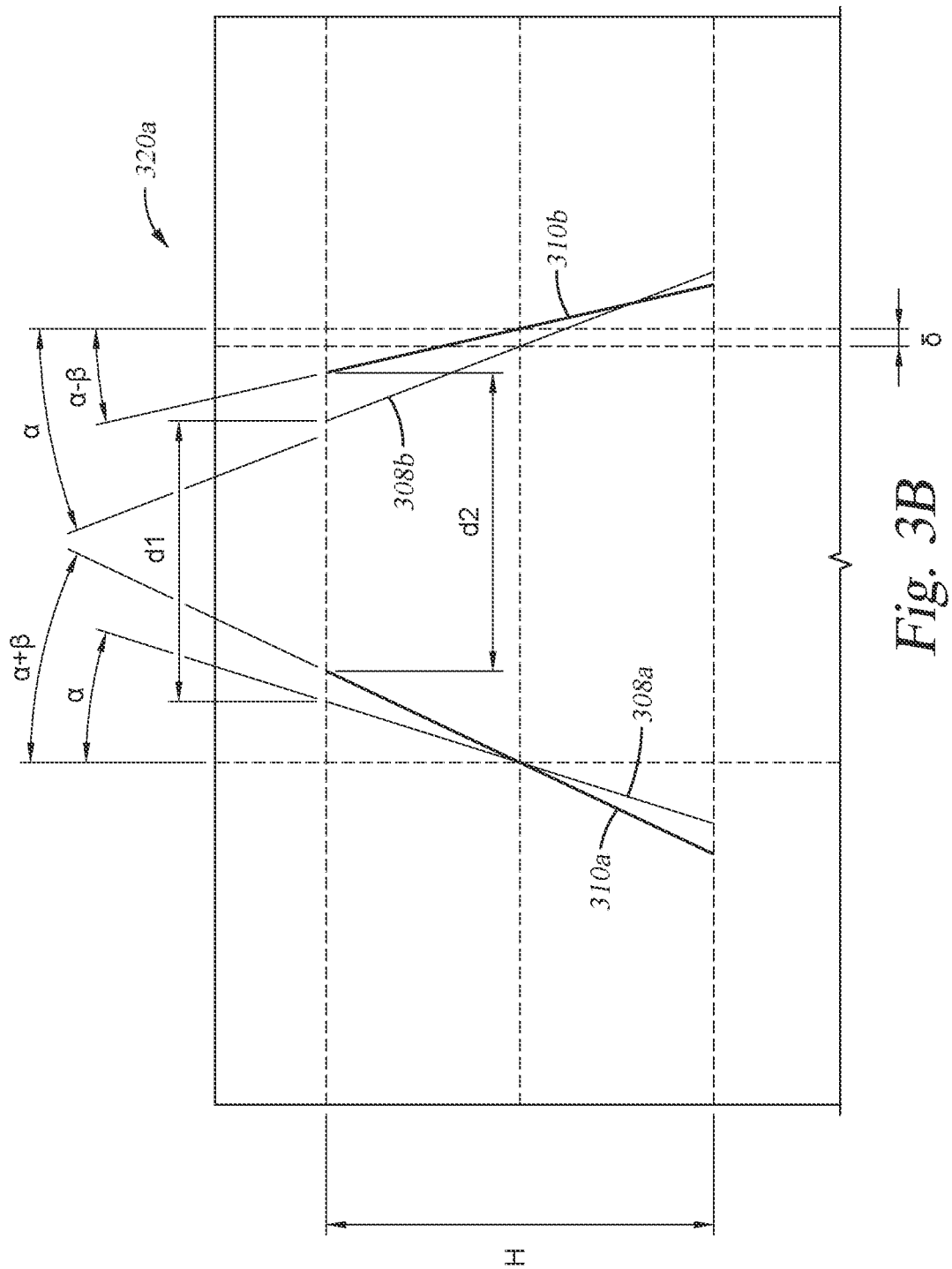

FIGS. 3A and 3B illustrate writer stripe pairs 308 of STW heads 320a and 320b for a STW head configuration according to one embodiment. FIGS. 3A and 3B illustrate two different configurations. One in which the first and second angles are +/−α and a configuration where the first angle is α+β and the second angle is α−β. Writer stripe pairs 308 comprise a first writer stripe 308a tilted at a first angle, and a second writer stripe 308b tilted at a second angle, wherein the first angle and the second angle are tilted away from a central axis by the same amount of degrees, but in opposite directions (i.e. the first angle=+α for one configuration, and the second angle=−α for one configuration or stated another way, the second angle is the negative of the first angle according to one configuration). As such, a servo pattern written to a tape (not shown) comprises a servo A burst written by the first writer stripe 308a and a servo B burst written by the second writer stripe 308b, wherein the servo A burst and the servo B burst form a uniform chevron pattern. However, a phenomenon occurs where during read back of the servo pattern, a signal magnitude of the read back signal from the servo A burst does not match the signal magnitude of the read back signal from the servo B burst. A solution for balancing the magnitude of the read back signals is a rotated servo pattern. Thus, the embodiments below disclose various configurations of tilted servo heads and/or tilted writer stripes for created rotated servo patterns.

Turning to the other configuration shown in FIGS. 3A and 3B, FIG. 3A illustrates a servo track writer (STW) head bar comprising multiple STW heads with tilted writer stripes according to one embodiment. FIG. 3A illustrates a top down view of a STW head bar 300 comprising two STW heads 320a and 320b. The STW head bar 300 may be the STW head bar 124 of FIG. 1 and FIG. 2. The STW head bar 300 may be within a servo pattern writer, such as the servo pattern writer 100 of FIG. 1.

The STW heads are identical. It is to be understood that although STW head bar 300 shows two STW heads 320a and 320b, the STW head bar 300 may comprise more or less STW heads depending on the embodiment. This is indicated by a line of dots beneath STW head 320b showing that more STW heads may be present. Two STW heads are merely shown for illustrative purposes. As such, only STW head 320a will be described in detail.

STW head 320a comprises a pair of writer stripes 310, wherein the pair of writer stripes 310 comprises a first writer stripe 310a tilted at a first angle, and a second writer stripe 310b tilted at a second angle, wherein the first angle and the second angle are tilted away from a central axis by a different amount of degrees. For example, the first writer stripe 310a may be tilted at a first angle between about 15 degrees (°) and about 20° away from a central axis, and the second writer stripe 310b may be tilted at a second angle of about −10° to about −5° away from the central axis. Thus, instead of the first angle and the second angle being tilted by the same amount of degrees in opposite directions (i.e. the first angle=+α, and the second angle=−α), the first angle is now represented by the formula α+β, and the second angle is represented by the formula α−β, wherein α is an original azimuth angle disclosed in previous approaches, and wherein p is an additional amount of degrees that a writer stripe is tilted by).

However, by tilting the first writer stripe 310a and the second writer stripe 310b at different angles, the length of each writer stripe must also be different in order to maintain a uniform servo stripe height "H." As shown in FIGS. 3A and 3B, the first writer stripe 310a has a longer stripe length than the second writer stripe 310b, because the first writer stripe 310a is tilted at a greater angle than the second writer stripe 310b. The stripe height H of writer stripe pairs 310 may be between about 70 micrometers (μm) and 80 μm. In embodiments where a STW head bar comprises two or more STW heads, a uniform data band y may also be maintained because the stripe heights of the first writer stripe 310a and the second writer stripe 310b are the same.

Turning specifically to FIG. 3B, a more in detailed view of STW head 320a of FIG. 3A is shown. A first distance "d1" represents a distance between a top point of the previously disclosed first writer stripe 308a and a top point of the second writer stripe 308b where the writer stripes are at angles of +/−a. A second distance d2 represents a distance between a top point of the current embodiment's first writer stripe 310a and a top point of the second writer stripe 310b. Ideally, d1 is equal to d2; however, because the first writer stripe 310a and the second writer stripe 310b are tilted away from a central axis by a different amount of degrees, the central axis of the second writer stripe 310b must be shifted in the horizontal direction in order to maintain a constant distance between the top points of the writer stripes. As such, the central axis of the second writer stripe 310b is shifted in the horizontal direction by a distance "δ," wherein δ=H tan(α+P)/2+H tan(α+β)/2−H tan(α), wherein H is the stripe height, α is the original azimuth angle, and p is an additional amount of degrees that a writer stripe is tilted by). Thus, d1 and d2 are expressed by the formula: d=(n+1)*s+t+g, wherein n is a number of stripes, s is a stripe pattern spacing, t is a stripe pattern width, and g is a burst pattern gap. For example, the stripe pattern spacing may be between about 1 μm and about 3 μm. The stripe pattern width may be between about 0.5 μm and about 1.75 μm. The burst pattern gap may be between about 3 μm to about 5 μm.

A benefit of tilting the first writer stripe 310a at a first angle, and the second writer stripe 310b at a second angle, wherein the first angle and the second angle are tilted away from a central axis by a different amount of degrees, is that this design can keep the same friction rate as previous STW head designs known in the art, while also minimizing written-in stripe position error, which will appear as a frozen position error signal (PES) when a servo pattern is written to a tape. However, more initial TDS control can be achieved by tilting the STW head bar.

Figure 4A:
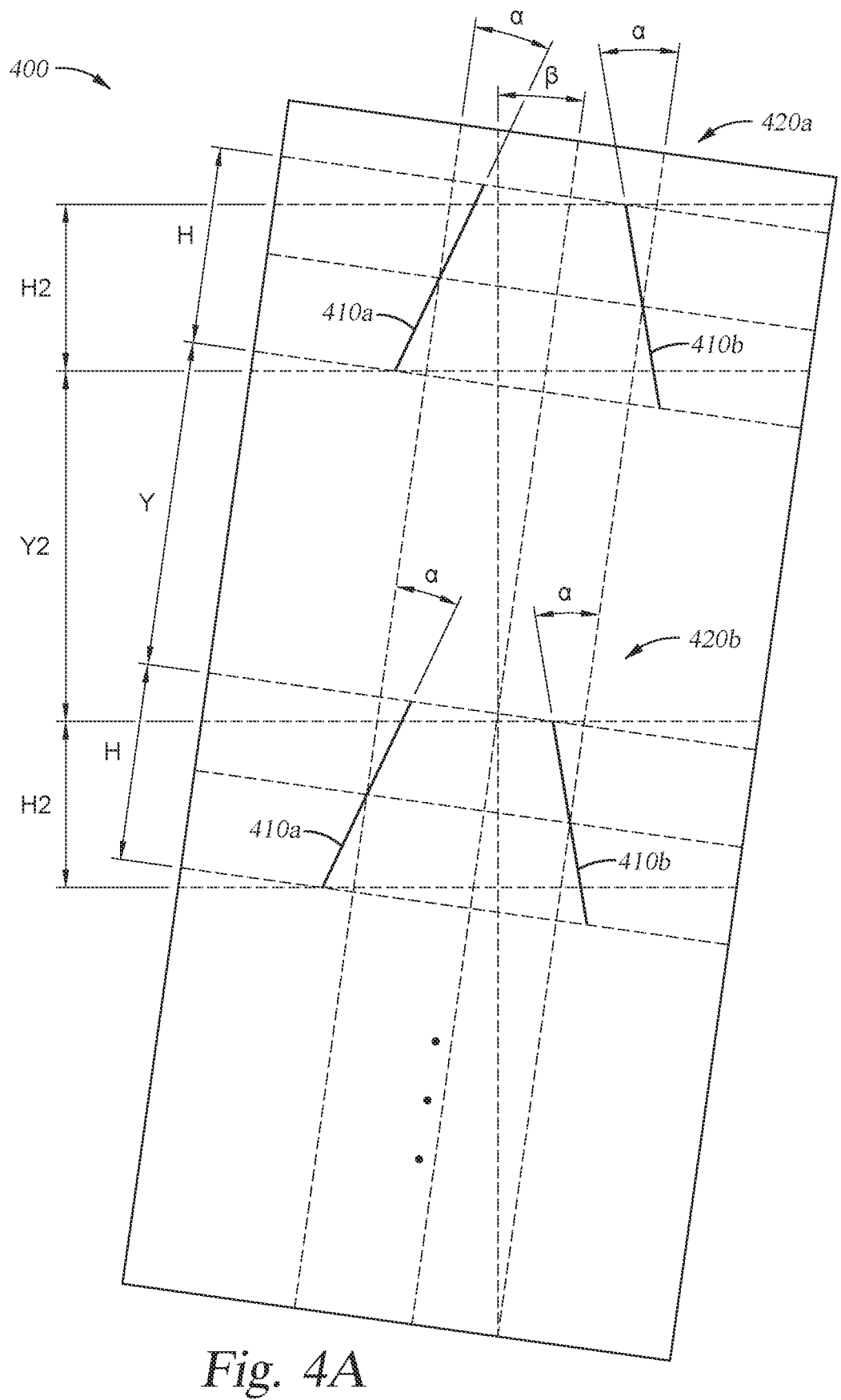
FIGS. 4A-4B illustrate a tilted STW head with writer stripes having the same length according to one embodiment.
Figure 4B:
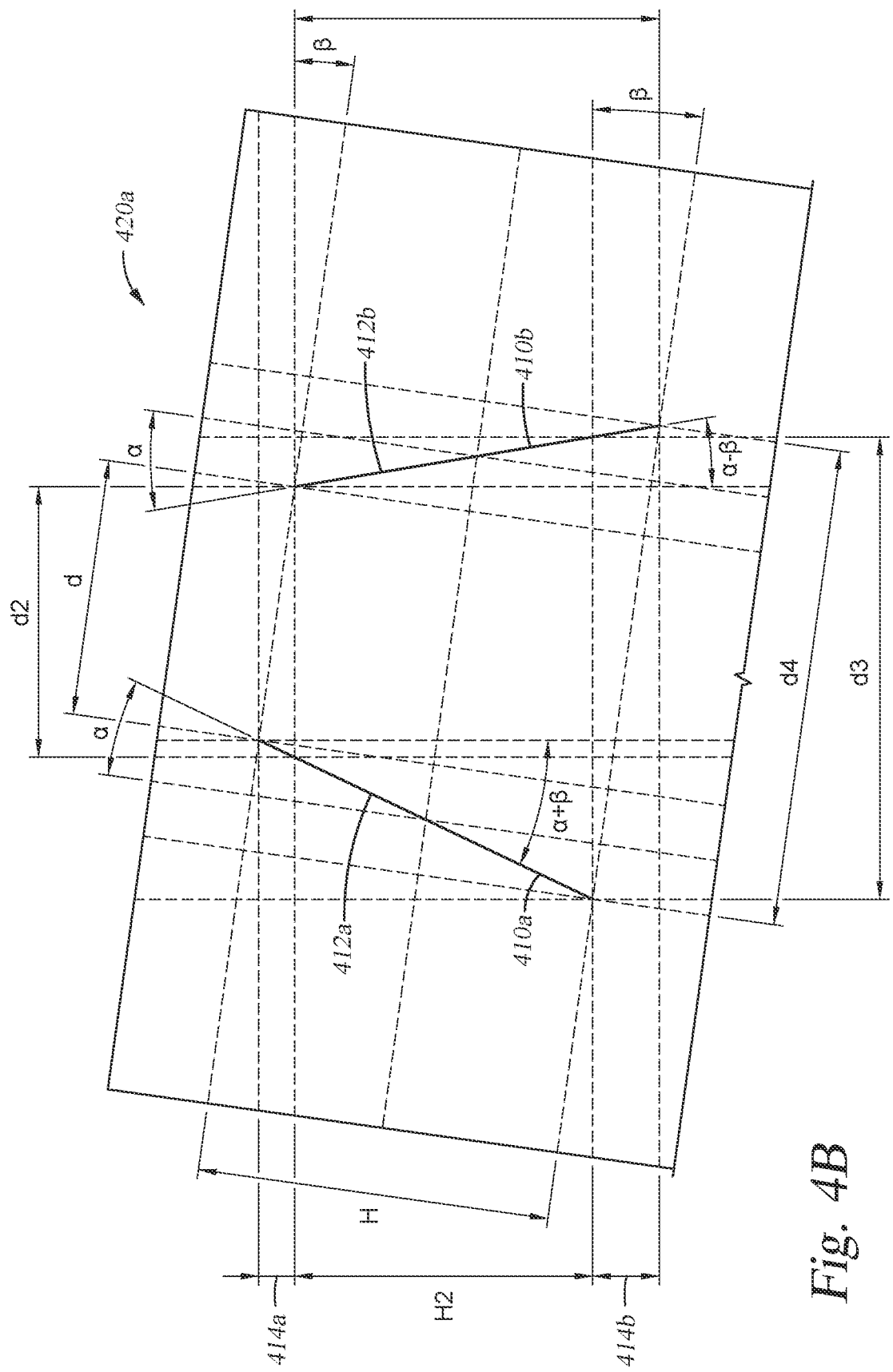

FIGS. 4A and 4B illustrate a tilted STW head with writer stripes having the same length according to one embodiment. FIG. 4A illustrates a top down view of a tilted head bar 400 comprising two STW heads 420a and 420b. The STW head bar 400 may be the STW head bar 124 of FIG. 1 and FIG. 2. The STW head bar 400 may be within a servo pattern writer, such as the servo pattern writer 100 of FIG. 1.

STW head bar 400 is tilted relative to a central axis at a first angle β, wherein β is a non 90° angle (i.e. the STW head bar 400 is tilted at such an angle that the head bar is not perpendicular to an edge of a hypothetical tape configured to pass under the STW head).

The STW heads 420a and 420b are identical. It is to be understood that although STW head bar 400 shows two STW heads 420a and 420b, the STW head bar 400 may comprise more or less STW heads depending on the embodiment. This is indicated by a line of dots beneath STW head 420b showing that more STW heads may be present. Two STW heads are merely shown for illustrative purposes. As such, only STW head 420a will be described in detail.

STW head 420a comprises a first writer stripe 410a having a first length 412a and a second writer stripe 410b having a second length 412b, wherein the second length 412b is equal to the first length 412a. The length 412a=H/cos(α), wherein H is a first stripe height, and α is the amount of degrees the writer stripes are tilted relative to the centerline of the head bar 400. Both the first writer stripe 410a and the second writer stripe 410b are tilted by the same azimuth angle α, but in opposite directions (i.e., the first writer stripe 410a is tilted at a second angle=+a, and the second writer stripe 410b is tilted at a third azimuth angle=−α). As such, STW heads 420a and 420b have two stripe heights, wherein the first stripe height H is the stripe height of writer stripe pair 410 if the STW head bar was not tilted, and wherein a second stripe height H2 is the stripe height of a servo pattern that will be written to a tape configured to pass under the STW heads 420a and 420b.

The first stripe height H is about 70 micrometers (μm) to about 80 μm. The second stripe height H2 is calculated by the formula H2=H cos(α+β)/cos(α)−d sin(β). The second stripe height H2 is smaller than the first stripe height H because although a top portion of the first writer stripe 410a extends above a top point of the second writer stripe 410b, and a bottom portion of the second writer stripe 410b extends below a bottom point of the first writer stripe 410a, the area of the servo pattern that is written by these portions will be erased by the STW heads during a data write operation.

A first data band width y represents a band width between the first STW head 420a and the second STW head 420b if the STW head bar 400 was not tilted. As such, a second data band width y2 represents the actual data band width between the first STW head 420a and the second STW head 420b, wherein y2=y cos(β)+d sin(β).

Turning to FIG. 4B, a more in detailed view of STW head 420a of FIG. 4A is shown. As described above, the entire STW head bar 400 is tilted at a first angle β (i.e. the STW head 420a is tilted at the first angle β). Therefore, the central axes that the first writer stripe 410a and the second writer stripe 410b are tilted relative to, is also tilted. Thus, the tilt of writer stripe pair 410 may also be described relative to a new central axis that is perpendicular to a hypothetical edge of a tape configured to pass under the tilted STW head 420a. The first writer stripe 410a is tilted at a second angle α+β relative to a central axis perpendicular to the hypothetical edge of the tape. The second writer stripe 410b is tilted at a third angle α−β relative to a central axis perpendicular to the hypothetical edge of the tape.

As discussed above, the first writer stripe 410a and the second writer stripe 410b have the same length, but a portion of the first writer stripe 410a is disposed above the second stripe height H2, and a portion of the second writer stripe 410b is disposed below the second stripe height H2. The distances that the first writer stripe 410a and the second writer stripe 410b extend beyond the bounds of the second stripe height H2 are not equivalent. The first writer stripe comprises a first end and a second end, and the second writer stripe comprises a first end and a second end, wherein each first end is disposed closer to the edge compared to each second end. In the present embodiment, due to the tilt angle of the STW head 420a, the first writer stripe 410a is closer to a hypothetical edge of a tape configured to pass under the STW head (i.e. the first end of the first writer stripe is closer to the edge compared to the first end of the second writer stripe, and the second end of the first writer stripe is closer to the edge compared to the second end of the second writer stripe). A first distance 414a is defined as the difference between the first end of the first writer stripe and the edge; and the first end of the second writer stripe and the edge, wherein 414a=d sin(β). A second distance 414b is defined as the difference between the second end of the first writer stripe and the edge; and the second end of the second writer stripe and the edge, wherein $414b=(d+2H \sin(\alpha))\sin(\beta)$.

Similar to the STW head 320a of FIG. 3B, it is ideal to maintain a first distance d between a first top point of the first writer stripe 410a and a second top point of the second writer stripe 410b, wherein $d=(n+1)*s+t+g$, wherein n is a number of stripes, s is a stripe pattern spacing, t is a stripe pattern width, and g is a burst pattern gap. For example, the stripe pattern spacing may be between about 1 µm and about 3 µm. The stripe pattern width may be between about 0.5 µm and about 1.75 µm. The burst pattern gap may be between about 3 µm to about 5 µm. However, a second distance d2 represents the actual distance between a top point of a servo A burst of a servo pattern written by the first writer stripe 410a and a top point of a servo B burst of a servo pattern written by the second writer stripe 410b, because when the servo pattern is written, the portion of the servo A burst that is written by the portion of the first writer stripe 410a that extends above the second stripe height H2 will be erased during a data writer operation. The second distance $d2=d \cos(\beta)+d \sin(\beta) \tan(\alpha+\beta)$.

A third distance d3, which is the distance between a first bottom point of the first writer stripe 410a and a second bottom point of the second writer stripe 410b, is described by the formula $d3=d+2H \sin(\alpha)$. However, because the STW head 420a is tilted, a fourth distance d4 is the actual distance between a bottom point of a servo A burst of a servo pattern written by the first writer stripe 410a, and a bottom point of a servo B burst of a servo pattern written by the second writer stripe 410b, because when the servo pattern is written, the portion of the servo B burst that is written by the portion of the second writer stripe 410b that extends below the second stripe height H2 will be erased during a data writer operation. The fourth distance $d4=(d+2H \sin(\alpha))(\cos(\beta)-\sin(\beta) \tan(\alpha-\beta))$.

A benefit of the embodiment disclosed in FIGS. 4A and 4B is that by tilting the STW head bar 400 at a first angle more initial TDS control can be achieved without having to alter the writer stripe pair 410. However, a tilted STW head with writer stripes of unequal length (i.e. one writer stripe is longer than the other) may be beneficial because the written servo pattern will more closely match the writer stripe configuration.

Figure 5A:
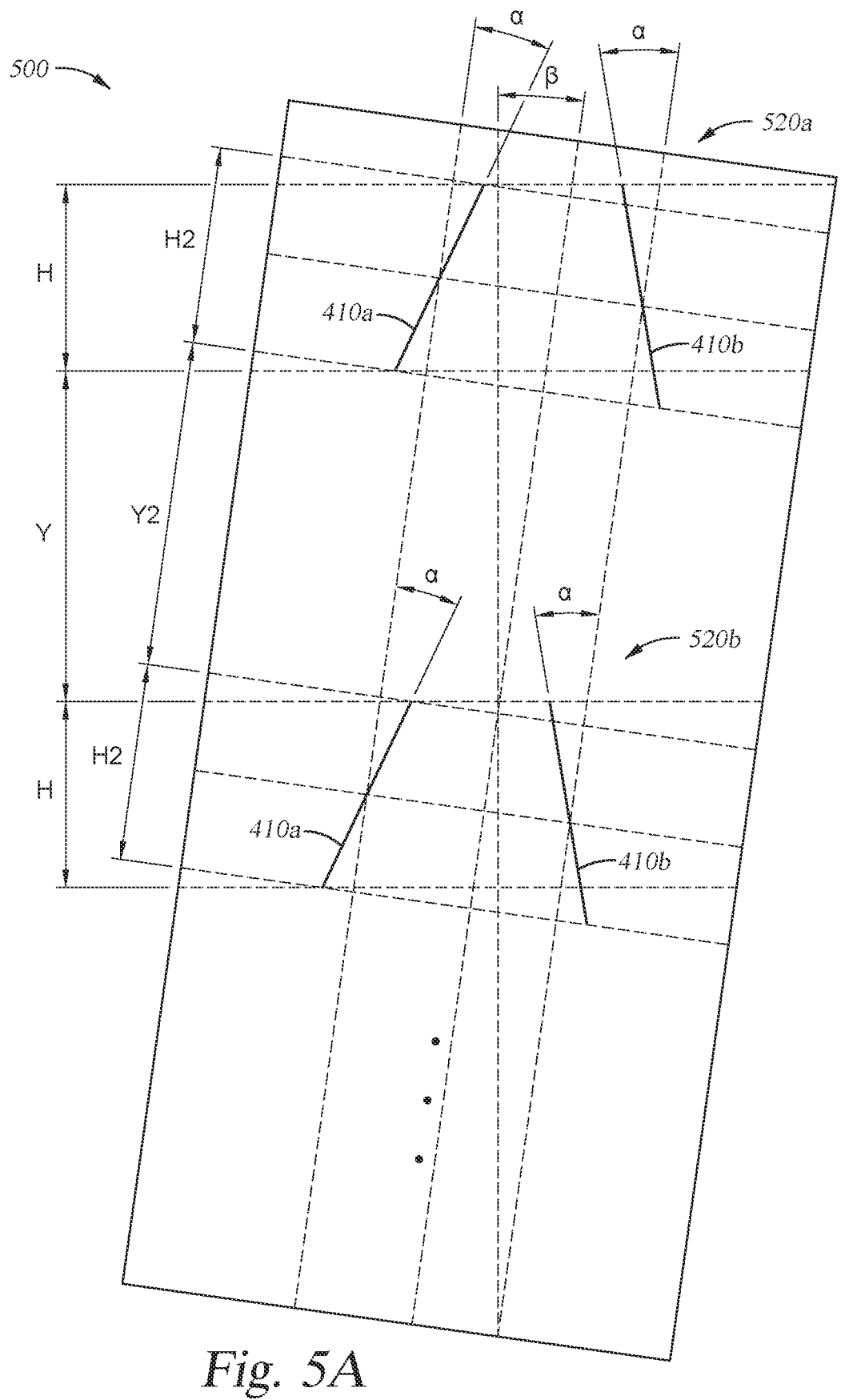
FIGS. 5A-5B illustrate a tilted STW head with writer stripes having different lengths according to various embodiments.
Figure 5B:
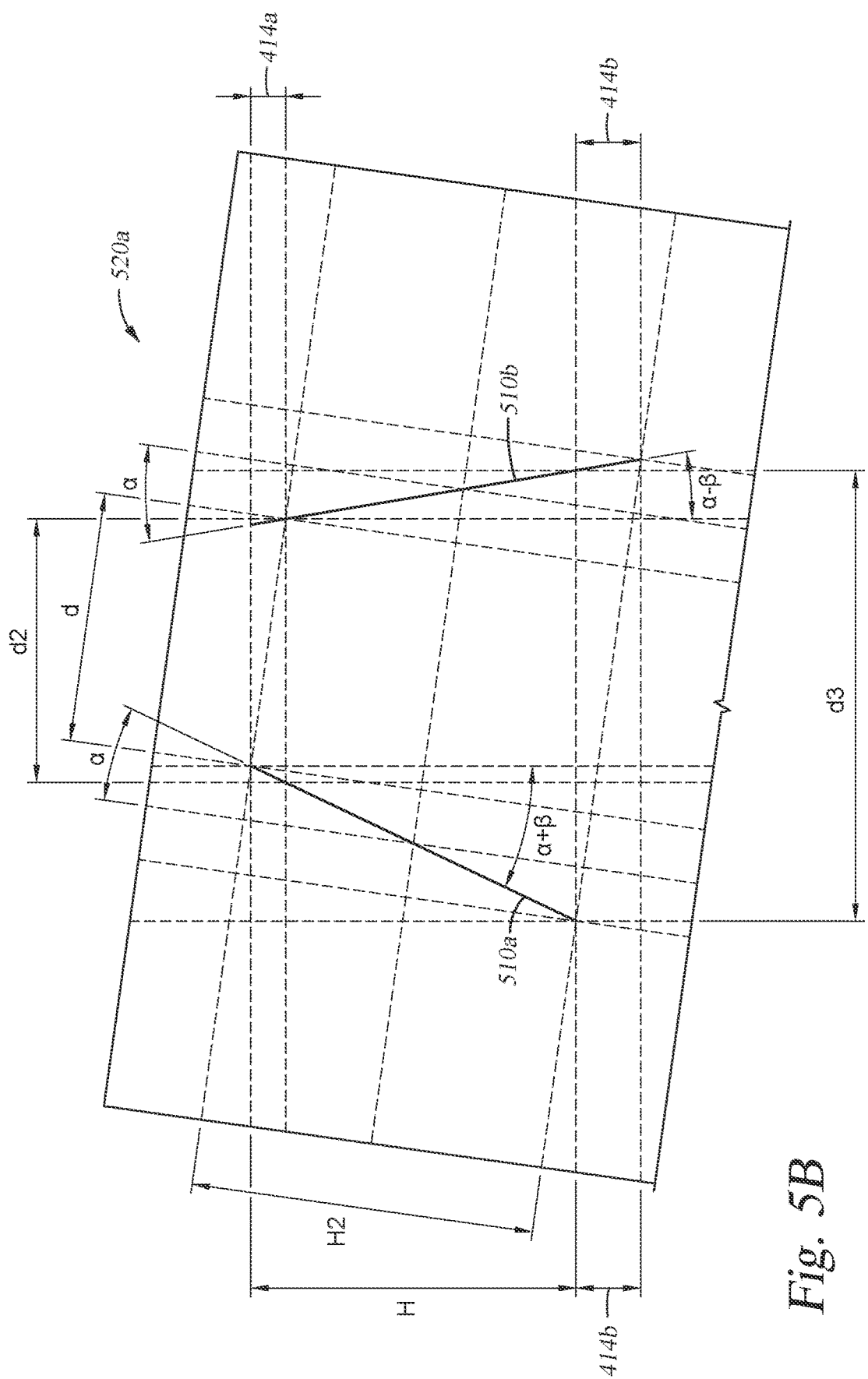

FIGS. 5A and 5B illustrate a tilted servo track writer (STW) head bar comprising multiple STW heads according to one embodiment. FIG. 5A illustrates a top down view of a STW head bar 500 comprising two STW heads 520a and 520b. The STW head bar 500 may be the STW head bar 124 of FIG. 1 and FIG. 2. The STW head bar 500 may be within a servo pattern writer, such as the servo pattern writer 100 of FIG. 1.

The STW heads 520a and 520b are identical. It is to be understood that although STW head bar 500 shows two STW heads 520a and 520b, the STW head bar 500 may comprise more or less STW heads depending on the embodiment. This is indicated by a line of dots beneath STW head 520b showing that more STW heads may be present. Two STW heads are merely shown for illustrative purposes. As such, only STW head 520a will be described in detail.

STW head 520a is similar to the STW head 420a of FIGS. 4A and 4B because the STW head bar 400 is tilted at a first angle β; however, here the first writer stripe 510a has a first length, and the second writer stripe has a second length, wherein the second length is not equal to the first length. The first writer stripe 510a has a first top point and a first bottom point, and the second writer stripe 510b has a second top point and a second bottom point. A first hypothetical line extends from the first top point to the second top point, wherein the hypothetical line is parallel to a hypothetical edge of a tape configured to pass under the STW head 520a. As such, in order for the first top point and the second top point to be located on the same first hypothetical line, a top portion of the second writer stripe 510b must be extended, as compared to the second writer stripe 410b of FIGS. 4A and 4B. However, similar to the second writer stripe 410b of FIGS. 4A and 4B, here, a bottom portion of the second writer stripe 510b extends below the first writer stripe 510a. As such, the length of the second writer stripe 510b is longer than the length of the first writer stripe 510a.

STW head 520a has a first stripe height H of about 70 micrometers (µm) to about 80 µm, and second stripe height H2, wherein $H2=H \cos(\alpha)/\cos(\alpha+\beta)$. The second stripe height H2 is smaller than the first stripe height H because although the second writer stripe 510b is longer than the first writer stripe 510a, and a bottom portion of the second writer stripe 510b extends below a bottom point of the first writer stripe 510a, the area of the servo pattern that is written by the bottom portion of the second servo writer will be erased during a data write operation.

Turning to FIG. 5B, a more in detailed view of STW head 520a of FIG. 5A is shown. As described above, the STW head 520a is the same as STW head 420a of FIGS. 4A and 4B, except the second writer stripe 510b is longer than the first writer stripe 510a because the top portion of the second writer stripe 510b is extended by a first distance 414a, wherein the first distance $414a=d \sin(\beta)$, wherein 414a is defined as the difference between the first end of the first writer stripe and the edge; and the first end of the second writer stripe and the edge (i.e. a top point of the second writer stripe 510b is extended a first distance 414a above a top point of the second writer stripe 410b, so that the top points of the writer stripes are located on the same hypothetical line, wherein the hypothetical line is parallel to a hypothetical edge of a tape that is configured to pass under the STW head 520a).

Similar to the STW head 320a of FIG. 3B, and STW head 420a of FIG. 4B, it is ideal to maintain a first distance d between a first top point of the first writer stripe 510a and a second top point of the second writer stripe 510b, wherein $d=(n+1)*s+t+g$, wherein n is a number of stripes, s is a stripe pattern spacing, t is a stripe pattern width, and g is a burst pattern gap. For example, the stripe pattern spacing may be between about 1 µm and about 3 µm. The stripe pattern width may be between about 0.5 µm and about 1.75 µm. The burst pattern gap may be between about 3 µm to about 5 µm. However, a second distance d2 represents the actual distance between a top point of a servo A burst of a servo pattern written by the first writer stripe 410a and a top point of a servo B burst of a servo pattern written by the second writer stripe 410b, because when the servo pattern is written, the portion of the servo A burst that is written by the portion of the first writer stripe 410a that extends above the second stripe height H2 will be erased during a data writer operation. The second distance $d2=d \cos(\beta)$.

A third distance d3, which is the distance between a bottom point of a servo A burst of a servo pattern written by the first writer stripe 510a, and a bottom point of a servo B burst of a servo pattern written by the second writer stripe 510b. The third distance d3 is not equal to the actual distance between a bottom point of the first writer stripe 510a and a bottom point of the second writer stripe 510b because when the servo pattern is written, the portion of the servo B burst that is written by the portion of the second writer stripe 510b that extends below the first stripe height H will be erased during a data writer operation. The third distance $d3=\cos(\beta)(H\tan(\alpha+\beta)+H\tan(\alpha-\beta)+d\cos(\beta))$.

A benefit of the embodiment disclosed in FIGS. 5A and 5B is that by extending the top of the second writer stripe 510b to be level with the top of the first writer stripe 510a, the written servo pattern will more closely match the writer stripe configuration. However, a tilted STW head with writer stripes of unequal length but where each writer stripe is shortened such that neither writer stripe extends beyond the stripe height of the other allows for a uniform data band width.

Figure 6A:
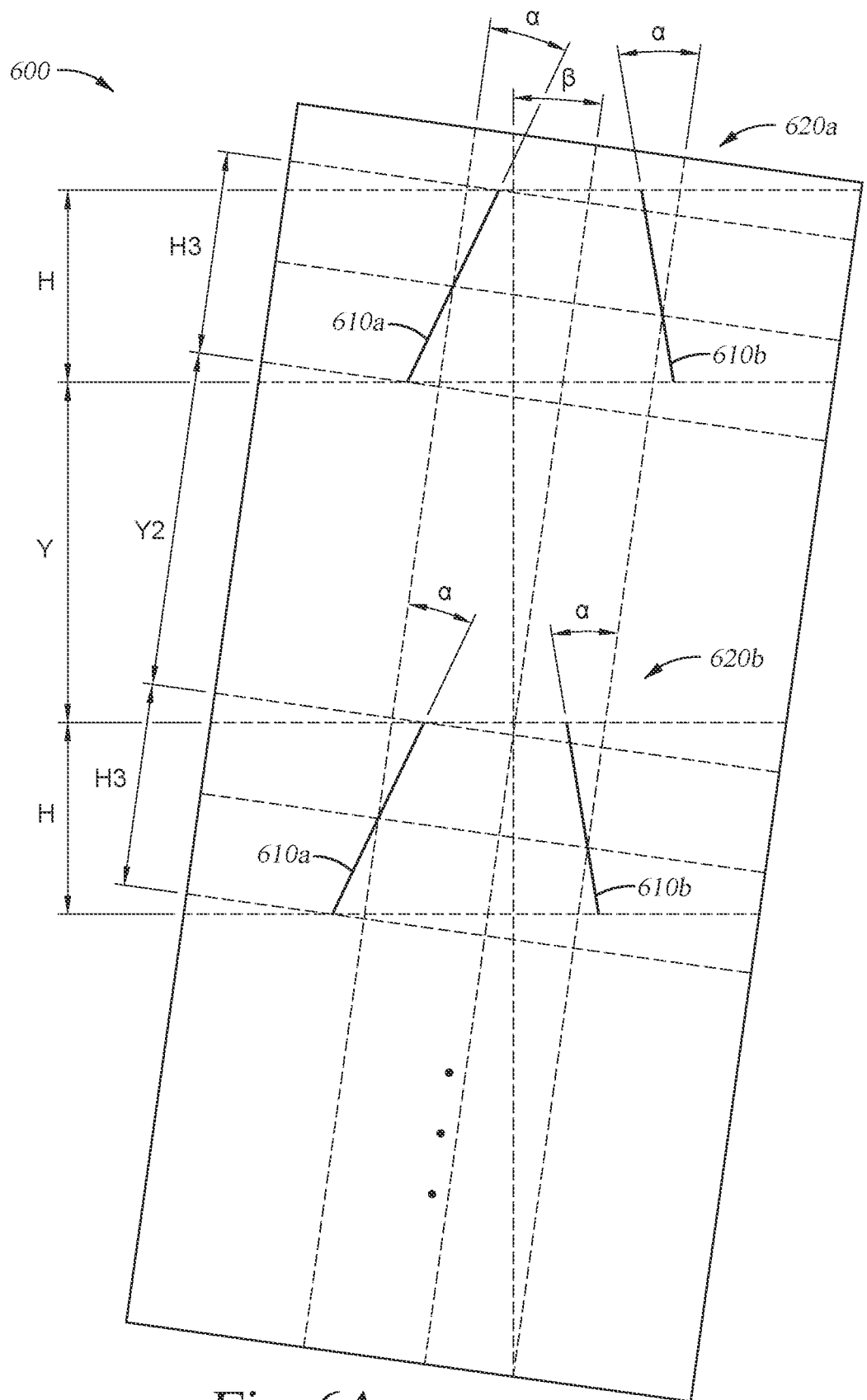
FIGS. 6A-6B illustrate a tilted STW head with writer stripes having different lengths according to various embodiments.
Figure 6B:
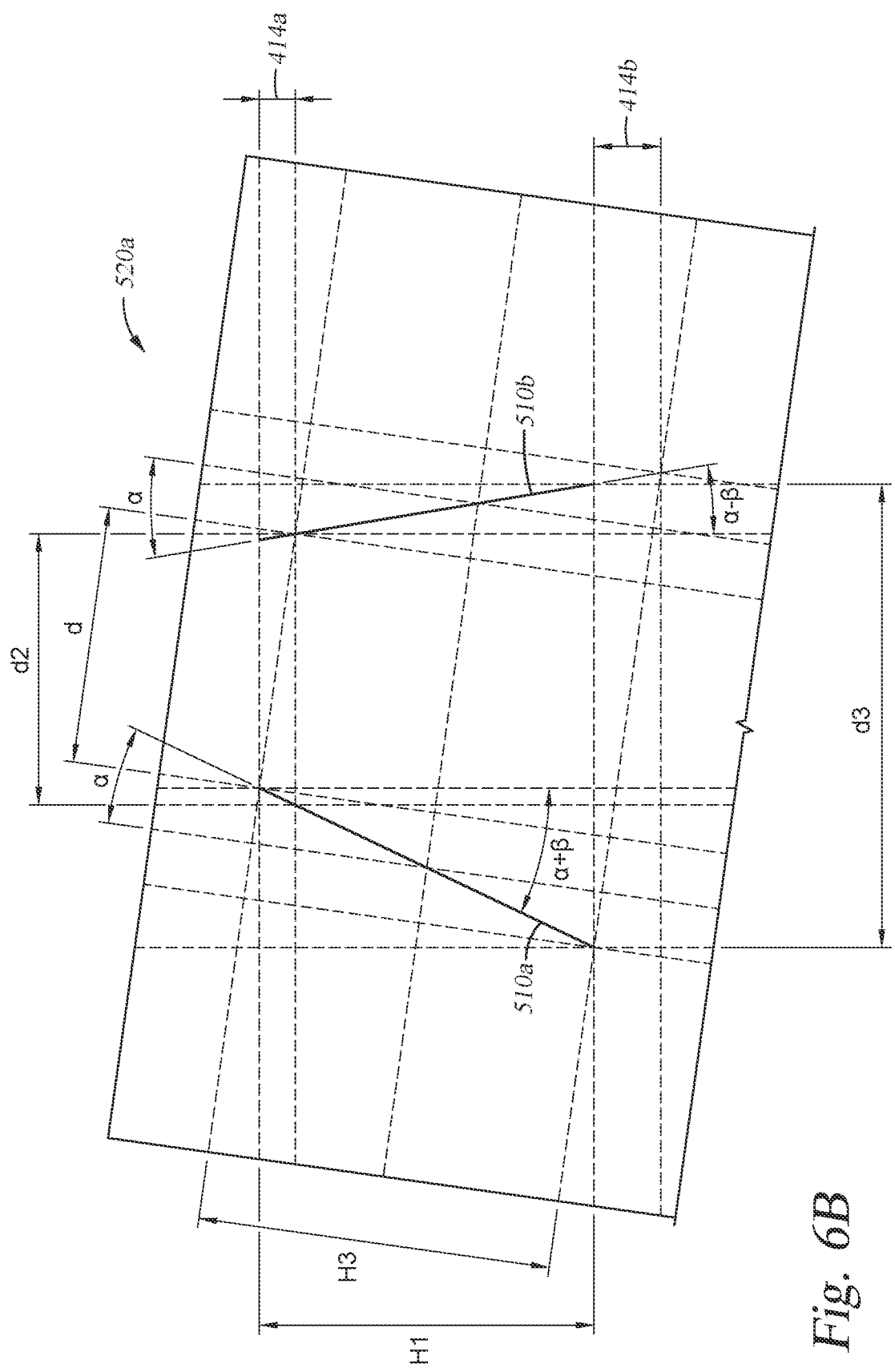

FIGS. 6A and 6B illustrate a tilted servo track writer (STW) head bar comprising multiple STW heads according to one embodiment. FIG. 6A illustrates a top down view of a STW head bar 600 comprising two STW heads 620a and 620b. The STW head bar 600 may be the STW head bar 124 of FIG. 1 and FIG. 2. The STW head bar 600 may be within a servo pattern writer, such as the servo pattern writer 100 of FIG. 1.

The two STW heads 620a and 620b are identical. It is to be understood that although STW head bar 600 shows two STW heads 620a and 620b, the STW head bar 600 may comprise more or less STW heads depending on the embodiment. This is indicated by a line of dots beneath STW head 620b showing that more STW heads may be present. Two STW heads are merely shown for illustrative purposes. As such, only STW head 620a will be described in detail.

STW head 620a is similar to STW head 520a of FIGS. 5A and 5B because the STW head bar 600 is tilted at a first angle β and a top point of the second writer stripe 610b extends so that a top point of both the first writer stripe 610a and the second writer stripe 610b are located on the same hypothetical line parallel to a hypothetical edge of a tape configured to pass under the STW head 600; however, here, a bottom portion of the second writer stripe is removed so that both the first writer stripe 610a and the second writer stripe 610b have the same stripe height. As such, in embodiments where the STW head bar 600 comprises two or more STW heads, a written servo pattern has a data band width y.

A third stripe height H3 is the same as the second stripe height H2 of FIG. 5A, and a second data band width y2 is the same as the second data band width y2 of FIG. 5A, and are shown to illustrate how the writer stripes 610 of FIGS. 6A and 6B differ from the writer stripes 510 of FIGS. 5A and 5B. However, here, the third stripe height H3 and the second data band width y2 do not represent the stripe height or the data band width of the written servo pattern.

Turning specifically to FIG. 6B, a more in detailed view of STW head 620a of FIG. 6A is shown. As described above, the STW head 620a is the same as STW head 520a of FIGS. 5A and 5B, except the second writer stripe 610b is shorter than the first writer stripe 610a because a portion of the second writer stripe 610b has been removed so that both a first bottom point of the first writer stripe 610a and a second bottom point of the second writer stripe 610b are located on a hypothetical line parallel to the hypothetical edge of a tape configured to pass under STW head 620a. The amount of the second writer stripe that must be removed is equal to the second distance 414b (see FIG. 4B), wherein $414b=(d+2H\sin(\alpha))\sin(\beta)$.

A first distance d, wherein d is the distance between a first top point of the first writer stripe 610a and a second top point of the second writer stripe 610b, is equal to the first distance d of STW head 520a of FIG. 5B, wherein $d=(n+1)*s+t+g$, wherein n is a number of stripes, s is a stripe pattern spacing, t is a stripe pattern width, and g is a burst pattern gap. For example, the stripe pattern spacing may be between about 1 μm and about 3 μm. The stripe pattern width may be between about 0.5 μm and about 1.75 μm. The burst pattern gap may be between about 3 μm to about 5 μm. A second distance d2, wherein d2 is the actual distance between a top point of a servo A burst of a servo pattern written by the first writer stripe 610a and a top point of a servo B burst of a servo pattern written by the second writer stripe 610b is equal to the second distance d2 of STW head 520s of FIG. 5B, wherein $d2=d\cos(\beta)$. Additionally, even though the second writer stripe 610b has been shortened compared to the second writer stripe 510b of STW head 520 of FIGS. 5B, a third distance d3, wherein d3 is the distance between a bottom point of a servo A burst of a servo pattern written by the first writer stripe 610a, and a bottom point of a servo B burst of a servo pattern written by the second writer stripe 610b, is the same as the third distance d3 of STW head 520a of FIG. 5B, wherein $d3=d3=\cos(\beta)(H\tan(\alpha+\beta)+H\tan(\alpha-\beta)+d\cos(\beta))$.

By tilting the STW head bar or tilting the writer stripes, the resulting servo pattern written to the tape is rotated and read-back signal accuracy is improved.

In one embodiment, a servo track writer (STW) head comprising: a first writer stripe tilted at a first angle, wherein the first writer stripe has a first stripe length; and a second writer stripe tilted at a second angle, wherein the second writer stripe has a second stripe length different than the first stripe length.

The STW head, wherein the first writer stripe has a first stripe height, and wherein the second writer stripe has a second stripe height substantially equal to the first stripe height. The STW head, wherein the first stripe height is between about 70 micrometers and 80 micrometers, and wherein a stripe width is between about 1 micrometers and 2 micrometers. The STW head, wherein the first angle and the second angle are tilted away from a central axis, and wherein the first angle and the second angle are different. The STW head, wherein the first angle is between about 15 degrees and 20 degrees, and wherein the second angle is between about −10 degrees and −5 degrees. The STW head, wherein the first stripe length is greater than the second stripe length. The STW head, wherein a distance between a first top point of the first writer stripe and a second top point of the second writer stripe is equal to $(n-1)s+t+g$, wherein n is a number of stripes, s is a stripe pattern spacing, t is a stripe pattern width, and g is a burst pattern gap. A servo pattern writer comprising the servo track writer.

In another embodiment, a servo pattern writer comprising: a servo track writer (STW) head comprising: a first writer stripe having a first stripe length; and a second writer stripe having a second stripe length different than the first stripe length, wherein the STW head is tilted at a first angle relative to an edge of a hypothetical tape configured to pass under the STW head, wherein the first angle is non-perpendicular to the edge.

The servo pattern writer, wherein the first stripe length is greater than the second stripe length, such that the first writer stripe and the second writer stripe have an equal stripe height. The servo pattern writer, wherein the first writer stripe has a first top point and a first bottom point, and wherein the second writer stripe has a second top point and a second bottom point, wherein a first hypothetical line extending from the first top point to the second top point is parallel to the edge. The servo pattern writer, wherein a second hypothetical line extending between the first bottom point and second bottom point is not parallel to the first hypothetical line. The servo pattern writer, wherein the first stripe length is less than the second stripe length, such that the first writer stripe has a first stripe height and the second writer stripe has a second stripe height different than the first stripe height. The servo pattern writer, wherein a bottom portion of the second writer stripe extends below a bottom point of the first writer stripe. The servo pattern writer, wherein the first writer stripe and the second writer stripe are disposed at angles relative to a centerline of the STW head. The servo pattern writer, wherein the first write stripe is disposed at a second angle, wherein the second write stripe is disposed at a third angle, and wherein the second angle is equal to negative third angle.

In yet another embodiment, a servo pattern writer comprising: a servo track writer (STW) head comprising: a first writer stripe having a first stripe length; and a second writer stripe having a second stripe length, wherein the second stripe length is substantially equal to the first stripe length, wherein the STW head is tilted at a first angle relative to an edge of a hypothetical tape configured to pass under the STW head, wherein the first angle is non-perpendicular to the edge.

The servo pattern writer, wherein the first writer stripe comprises a first end and a second end, wherein the second writer stripe comprises a first end and a second end, wherein each first end is disposed closer to the edge compared to each second end, and wherein the first end of the first writer stripe is closer to the edge compared to the first end of the second writer stripe. The servo pattern writer, wherein the second end of the first writer stripe is closer to the edge compared to the second end of the second writer stripe. The servo pattern writer, wherein: a first difference is defined between: the first end of the first writer stripe and the edge; and the first end of the second writer stripe and the edge; and a second difference is defined between: the second end of the first writer stripe and the edge; and the second end of the second writer stripe and the edge, wherein the first difference is not equal to the second difference.

While the foregoing is directed to embodiments of the present disclosure, other and further embodiments of the disclosure may be devised without departing from the basic scope thereof, and the scope thereof is determined by the claims that follow.

What is claimed is:

1. A servo track writer (STW) head, comprising:
   a first writer stripe tilted at a first angle, wherein the first writer stripe has a first stripe length; and
   a second writer stripe tilted at a second angle, wherein the second writer stripe has a second stripe length different than the first stripe length, wherein a first central axis of the second writer stripe is shifted in a direction parallel to a direction of tape movement.

2. The STW head of claim 1,
   wherein the first writer stripe has a first stripe height, and
   wherein the second writer stripe has a second stripe height substantially equal to the first stripe height.

3. The STW head of claim 2, wherein the first stripe height is between about 70 micrometers and 80 micrometers, and wherein a stripe width is between about 1 micrometers and 2 micrometers.

4. The STW head of claim 1, wherein the first angle and the second angle are tilted away from a second central axis between the first writer stripe and the second writer stripe, and wherein the first angle and the second angle are different.

5. The STW head of claim 4, wherein the first angle is between about 15 degrees and 20 degrees, and wherein the second angle is between about −10 degrees and −5 degrees.

6. The STW head of claim 4, wherein the first stripe length is greater than the second stripe length.

7. The STW head of claim 1, wherein a distance between a first top point of the first writer stripe and a second top point of the second writer stripe is equal to (n−1)s+t+g, wherein n is a number of stripes, s is a stripe pattern spacing, t is a stripe pattern width, and g is a burst pattern gap.

8. A servo pattern writer comprising the STW head of claim 1.

9. A servo track writer (STW) head, comprising:
   a first writer stripe tilted at a first angle, the first writer stripe having a first stripe length; and
   a second writer stripe tilted at a second angle, the second writer stripe having a second stripe length different than the first stripe length, wherein a distance between a first top point of the first writer stripe and a second top point of the second writer stripe is equal to (n−1)s+t+g, wherein n is a number of stripes, s is a stripe pattern spacing, t is a stripe pattern width, and g is a burst pattern gap.

10. The STW head of claim 9,
    wherein the first writer stripe has a first stripe height, and
    wherein the second writer stripe has a second stripe height substantially equal to the first stripe height.

11. The STW head of claim 10, wherein the first stripe height and the second stripe height are each individually between about 70 micrometers and 80 micrometers.

12. The STW head of claim 9, wherein the first angle and the second angle are tilted away from a central axis, and wherein the first angle and the second angle are different.

13. The STW head of claim 12, wherein the first angle is between about 15 degrees and 20 degrees, and wherein the second angle is between about −10 degrees and −5 degrees.

14. A servo pattern writer comprising the STW head of claim 9.

15. A servo track writer (STW) head, comprising:
    a plurality of writer stripe pairs, each writer stripe pair comprising:
       a first writer stripe tilted at a first angle, the first writer stripe having a first stripe length; and
       a second writer stripe tilted at a second angle, the second writer stripe having a second stripe length different than the first stripe length,
    wherein a distance between a first top point of the first writer stripe and a second top point of the second writer stripe is equal for each writer stripe pair.

16. The STW head of claim 15, wherein a first central axis of the second writer stripe is shifted in a direction parallel to a direction of tape movement to maintain the equal distance between the first top point of the first writer stripe and the second top point of the second writer stripe for each writer stripe pair.

17. The STW head of claim 15, wherein the first angle and the second angle are tilted away from a second central axis between the first writer stripe and the second writer stripe, and wherein the first angle and the second angle are different.

18. The STW head of claim 17, wherein the first angle is between about 15 degrees and 20 degrees, wherein the second angle is between about −10 degrees and −5 degrees, and wherein the first stripe length is greater than the second stripe length.

19. The STW head of claim 15, wherein the distance between the first top point of the first writer stripe and the second top point of the second writer stripe is equal to (n−1)s+t+g, wherein n is a number of stripes, s is a stripe pattern spacing, t is a stripe pattern width, and g is a burst pattern gap.

20. A servo pattern writer comprising the STW head of claim 15.

\* \* \* \* \*